United States Patent
Rafii et al.

(10) Patent No.: US 12,520,019 B2
(45) Date of Patent: Jan. 6, 2026

(54) DETECTING AND REMOVING MEDIA MODIFICATIONS FOR IDENTIFICATION SERVICES AND COPYRIGHT COMPLIANCE

(71) Applicant: Audible Magic Corporation, Los Gatos, CA (US)

(72) Inventors: Zafar Rafii, Seattle, WA (US); Erling Wold, San Francisco, CA (US); Todd Patrick McGee, Montara, CA (US); Richard Boulderstone, Peterborough (GB)

(73) Assignee: Audible Magic Corporation, Los Gatos, CA (US)

( * ) Notice: Subject to any disclaimer, the term of this patent is extended or adjusted under 35 U.S.C. 154(b) by 62 days.

(21) Appl. No.: 18/482,655

(22) Filed: Oct. 6, 2023

(65) Prior Publication Data

US 2025/0119626 A1 Apr. 10, 2025

(51) Int. Cl.
*H04N 21/845* (2011.01)
*H04N 21/81* (2011.01)

(52) U.S. Cl.
CPC ..... *H04N 21/8453* (2013.01); *H04N 21/8113* (2013.01)

(58) Field of Classification Search
CPC .............. H04N 21/8453; H04N 21/8113
See application file for complete search history.

(56) References Cited

U.S. PATENT DOCUMENTS

| | | | |
|---|---|---|---|
| 2008/0250065 A1* | 10/2008 | Barrs | G06Q 30/02 |
| 2018/0061457 A1* | 3/2018 | Fisher | G06F 3/0482 |
| 2019/0342611 A1* | 11/2019 | Qiang | H04N 21/4666 |
| 2021/0374193 A1* | 12/2021 | Aher | G06F 16/909 |
| 2022/0027407 A1 | 1/2022 | Ikezoye et al. | |
| 2022/0174358 A1* | 6/2022 | Zavesky | G06V 20/46 |
| 2023/0244710 A1 | 8/2023 | Wold et al. | |

OTHER PUBLICATIONS

Extended European Search Report for European Application No. 24204718.1, mailed Mar. 3, 2025, 8 Pages.

* cited by examiner

*Primary Examiner* — Viet D Vu
(74) *Attorney, Agent, or Firm* — Lowenstein Sandler LLP

(57) ABSTRACT

A system processed a representation of a media content item using a trained machine learning model to identify whether the media content item is a modified media content item. The trained machine learning model outputs an indication of one or more modifications of the media content item. Responsive to determining that the one or more modifications satisfy a criterion, one or more operations are performed on the media content item in view of the one or more modifications to generate an updated media content item. The updated media content item is compared to known media content items to identify known material contained therein.

20 Claims, 6 Drawing Sheets

DETECTING AND REMOVING MEDIA MODIFICATIONS FOR IDENTIFICATION SERVICES AND COPYRIGHT COMPLIANCE

TECHNICAL FIELD

This disclosure relates to the field of media content identification, and in particular to detecting and removing media modifications for identification services and copyright compliance.

BACKGROUND

A large and growing population of users enjoy entertainment through the consumption of media content items, including electronic media, such as digital audio and video, images, documents, newspapers, podcasts, etc. Media content sharing platforms provide media content items to consumers through a variety of means. Users of the media content sharing platform may upload media content items (e.g., user generated content (UGC)) for the enjoyment of the other users. Some users upload content to the media content sharing platform that is or includes at least portions of a known work (e.g., copyrighted music) of a content owner. Some users alter the portions of a known work included in uploaded media content item (e.g. UGC), for example by speeding up or slowing down the portion of the known work, or changing the pitch. Users may alter the portions of the known work for aesthetic reasons, or to try to evade copyright detection. An entity seeking to identify uploads of or containing protected, known works (e.g., performances, compositions, albums, songs, etc.) will generally have to review uploaded media content items (e.g., UGC) to determine whether those uploaded media content items contain some or all of such known works. Identifying altered portions of known works included in uploaded media content items can pose additional challenges, since the portion of the known work included in the uploaded media content item may not have the same identifiable characteristics as the original known work. Once the protected works are identified, the entity makes a determination of whether the works are i) unauthorized, in which case the media may be blocked from distribution or the work muted or deleted; or are ii) authorized and licensed, in which case the works are allowed to be distributed according to the terms of the licensing agreement, and reports may be generated on the usage for delivery to the rights holders.

The process of evaluating each and every media content item uploaded by users and/or evaluating the entire available content of a media content supplier (e.g., a media content sharing platform) to identify particular known works contained therein is time consuming and requires a substantial investment into computing/processing power and communication bandwidth, especially if the known works are altered from their original state. Moreover, the amount of UGC that is uploaded to media content sharing platforms continues to grow, both in terms of the number of instances of uploaded UGC and in the duration or length of each instance of UGC. As a result, the amount of resources that are used to process UGC and identify instances of known (e.g., copyrighted) material within such UGC is continually increasing.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
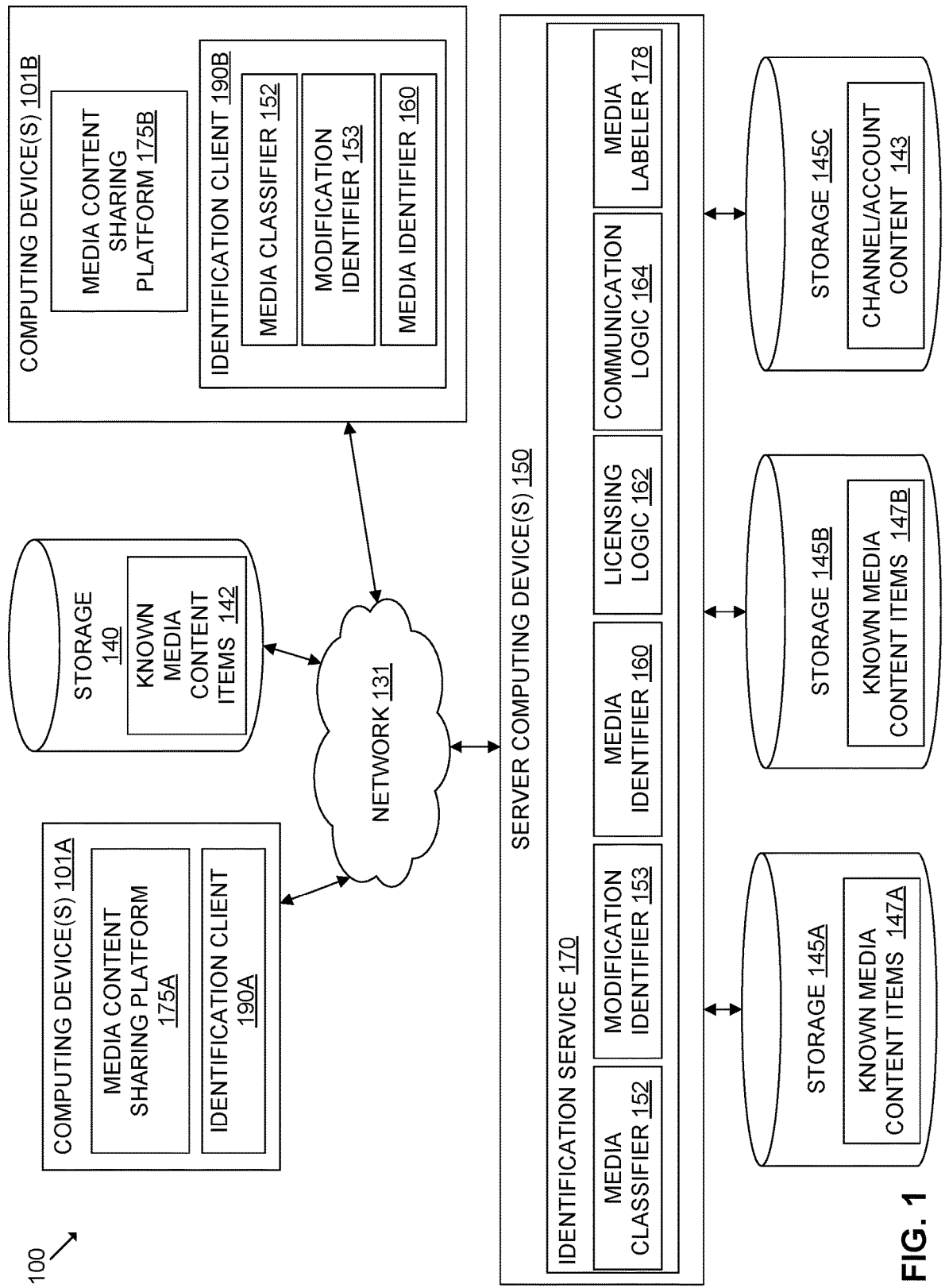
FIG. 1 is a block diagram illustrating a network environment in which embodiments of the present disclosure may operate.

Embodiments described herein relate to systems and methods for determining whether a media content item (e.g., UGC) has been modified from a prior version, and if so, identifying the modification(s) of the media content item. A media content item (e.g., UGC) may be audio (e.g., a song or album), an image, a video, text, or other work. Media content items may be files (e.g., audio files having formats such as WAV, AIFF, AU, FLAC, ALAC, MPEG-4, MP3, Opus, Vorbis, AAC, ATRAC, WMA, and so on, or video files having formats such as WebM, Flash Video, F4V, Vob, Ogg, Dirac, AVI, QuickTime File Format, Windows Media Video, MPEG-4, MPEG-1, MPEG-2, M4V, SVI, MP4, FLV, and so on). Media content items may also be live streams of video and/or audio media. Media content items may correspond to or include UGC in embodiments. For example, media content items may be uploads to user accounts and/or channels on Twitch®, Vimeo®, Wistia®, Vidyard®, SproutVideo®, Daily Motion®, YouTube®, Facebook®, TikTok®, Instagram®, and so on.

Today, many pieces of content are available to be viewed both offline and online through a diverse collection of media content sharing platforms. In one common case, a media content sharing platform will monetize an instance of media content during the presentation of the content to the end user. Monetization of media content includes displaying other content such as advertisements and/or promotional media alongside, before, or after presenting the media content item. Interested parties, such as a content sharing platform, a user uploading the media content item, a media content item owner, or a media content item publisher may wish to determine whether the media content item is or includes known material (e.g., a known work, other known media content items) so that licensing rates may be applied for the media content item and/or the media content item can be removed from the media content sharing platform.

A media content identification service may receive the media content item for processing locally (to the media content sharing platform) or remotely (from the media content sharing platform) over a network. A local service may incur substantial, costly computation and storage expenses to process requests for identification. A remote service may incur the computation and storage expenses, and may further incur costly bandwidth expenses to process requests for identification. The greater the number of identification requests or attempts that are performed, the greater the utilization of processor and/or bandwidth resources, and the greater the overall cost.

Popularity of media content sharing platforms is ever increasing. The user bases for popular media content sharing platforms have already expanded to over a billion users. An active set of these users is uploading user generated content. User generated content (UGC) may include the work or material of another that is subject to copyright protections (e.g., video or audio known works and/or other known material). Every new instance of user generated content generally should be analyzed against known works licensed for use by a platform hosting the UGC (e.g., to determine whether portions of such UGC contain portions of known, and optionally copyrighted, material). A media content identification service can receive billions of transactions each and every month, where each transaction involves the analysis of all or a portion of a media content item. For example, each transaction can involve an attempt to match a 5-30 second segment of a media content item (i.e., UGC) with a portion of a known work (e.g., a 5-30 second portion of a known musical performance). To determine such a match, a digital fingerprint of the 5-30 second portion of the known work may be generated, and may be compared to digital fingerprints of every work (e.g., copyrighted performance) stored in a database. Thus, even performing a single match for a single snippet of UGC can take considerable processing power. Moreover, many identification transactions are generally performed for even just a single media content item.

The magnitude of transactions received can lead to increased costs and even delayed processing requests while preceding requests are processed. Today's solutions to media content item identification and licensing can be costly and time consuming. For example, a media content sharing platform which seeks to determine if a new instance of user generated content should be removed or flagged for licensing generally sends the recently uploaded user generated content (or digital fingerprints of such) to the media content identification service for each and every instance of uploaded content. A digital fingerprint of the UGC is generally created, and that digital fingerprint is sampled to determine digital fingerprint segments of some length (e.g., 5, 10, 15, 20, 25 or 30 seconds) at a fixed interval (e.g., every 5 seconds, 10 seconds, 15 seconds, 20 seconds, 25 seconds, 30 seconds, 60 seconds, 2 minutes, 4 minutes, 5 minutes or 10 minutes) that are to be tested (e.g., compared to digital fingerprints of known media content items). The simplest pattern of sampling the digital fingerprint for testing is a regular grid. Alternatively, the UGC may be sampled such that a digital fingerprint is generated for a segment of some length (e.g., 5, 10, 15, 20, 25 or 30 seconds) at a fixed interval (e.g., every 5 seconds, 10 seconds, 15 seconds, 20 seconds, 25 seconds, 30 seconds, 60 seconds, 2 minutes, 4 minutes, 5 minutes or 10 minutes) within the UGC. For example, a digital fingerprint of a 5 second segment may be generated every 10-30 seconds in the UGC. In either use case, for an hour long media content item uploaded by a user, there may be about 120-360 identification transactions. For each such identification transaction, a segment of the user generated content may be processed for a match against every segment of every registered known work in a reference database of the identification service.

Identifying known items within media content items that have been modified can further increase the number of transactions. A media content item (e.g., UGC) may include modified or altered portions of known items. For example, a media content item can include a portion of a song that has been sped up in order to fit within the time period of the media content item. As another example, a media content item can include a cropped version of a video. Users may modify portions of known works for aesthetic reasons, to try to evade copyright detection, or for some other reason. Identifying known works that have been modified from their prior version within a media content item can increase the number of transactions performed by the some media content identification services. After comparing a media content item (e.g., UGC) to known media content items, if a match has not been identified, a media content identification service may attempt to identify certain common media modifications. For example, a media content identification service may apply common media modification reversions to a media content item (e.g., UGC), and then compare the reverted media content item to known media content items by repeating the process described above. However, without knowing how, or even whether, the media content item has been modified, this approach can drastically increase the number of transactions performed in order to identify known material in media content items.

To reduce the computing resource cost and/or processing time for identification of each media content item, a media content identification service may identify and reverse modification(s) in a media content item prior to identifying known works within the media content item. The media content identification service may process the media content item using a machine learning model. The machine learning model can be trained to determine whether a media content item has been modified, and optionally to identify the way(s) in which the media content item has been modified. The output of the machine learning model can be an indication of whether and/or how the media content item has been modified. For example, the machine learning model can output a vector of values, each value corresponding to a likelihood that a particular modification is present in the media content item. For example, the vector of values can correspond to multiple speed rates, and each value in the vector can represent a likelihood that the speed of the media content item has been modified by the corresponding speed rate. As another example, the machine learning model can output a single value corresponding to a particular modification that is likely to be present in the media content item. For example, the machine learning model can output a value representing a particular speed rate modification of the media content item.

Using the output of the machine learning model, the media content identification service can perform operations on the media content item to reverse the identified modifications to generate an updated media content item. In some embodiments, the media content identification service can reverse the modification that the machine learning model identified as the most likely modification. For example, each identified modification can have a corresponding likelihood score (e.g., the likelihood value), representing the likelihood that the corresponding modification is present in the media content item, and the media content identification service can identify the modification with the highest likelihood score. The media content identification service can then compare the updated media content item to known media content items to determine whether the media content item contains known material. The media content identification service can perform operations to reverse identified modifications until either all identifications modifications have been reversed, or until a match to a known work is identified. In some embodiments, the media content identification service can perform operations to reverse the identified modifications for identified modifications that have a corresponding likelihood score exceeding a threshold value.

Aspects of the present disclosure present advantages, including but not limited to, improved efficiency and accuracy in identifying known works within unknown media content items (e.g., UGC). Attempting to identify known works within an unknown media content item that has been modified can result in many failed media identification operations, which can be computing resource intensive. By identifying and reversing modifications on the unknown media content item before comparing it to known works, aspects of the present disclosure consume fewer resources to identify known material within the unknown media content item. That is, rather than perform multiple resource-identification media identification operations on a media content item that has been modified, aspects of the present disclosure can reverse the modification(s) prior to performing the media identification operations. Not only the efficiency of the resource-intensive media identification operations improved, the accuracy of the identification results is also improved over conventional methods. Furthermore, detecting and reversing modifications using the techniques described throughout provides a cost benefit of the conventional approach of trial and error, thus resulting in a more efficient and cost-effective system.

FIG. 1 is a block diagram illustrating a network environment 100 in which embodiments of the present disclosure may operate. In one embodiment, network environment 100 includes one or more computing devices (e.g., computing device 101A, computing device 101B, and/or server computing device 150) connected via network 131. Any number of computing devices 101A-B can communicate with each other and/or with server computing device 150 through network 131. The network 131 can include a local area network (LAN), a wireless network, a telephone network, a mobile communications network, a wide area network (WAN) (e.g., such as the Internet) and/or similar communication system. The network 131 can include any number of networking and computing devices such as wired and/or wireless devices.

The computing devices 101A-B and server computing device 150 may include one or more physical machines and/or virtual machines hosted by physical machines. The physical machines may include rackmount servers, desktop computers, and/or other computing devices. In one embodiment, the computing devices 101A-B and/or server computing device 150 include a virtual machine managed and provided by a cloud service provider system. Each virtual machine offered by a cloud service provider may be hosted on a physical machine configured as part of a cloud. Such physical machines are often located in a data center. A cloud provider system and cloud may be provided as an infrastructure as a service (IaaS) layer. One example of such a cloud is Amazon's® Elastic Compute Cloud (EC2®).

Computing devices 101A-B each host a media content sharing platform 175A-B (e.g., such as YouTube®, Vimeo®, Wistia®, Vidyard®, SproutVideo®, Daily Motion®, Facebook®, Instagram®, TikTok®, etc.). Computing devices 101A-B may include local storage (not shown) for storing an Operating System (OS), programs, and/or specialized applications to be run on the computing device. Computing devices 101A-B may further include storage for storing media content items of the media content sharing platforms 175A, 175B. The media content items may also be stored in attached or remote storage, such as in a storage area network (SAN), a network attached storage (NAS), or a cloud storage platform (e.g., a storage as a service provided by a cloud service platform). In an example, computing device 101B is connected to storage 140, which stores information on known media content items 142, which may be a subset of a larger store or database of known media content items 147A-B.

Media content sharing platforms 175A-B receive and store user uploads of user generated content and other content. User generated content (UGC) includes any form of content, such as images, videos, text, and/or audio, that has been posted by users on media content sharing platforms (i.e., online platforms) such as social media and wikis. Such UGC may then be accessible to other users. User generated content includes media content items that have been uploaded to the media content sharing platform. Such media content items are unidentified media content items on upload, and may include known material in many instances. User generated content may include known material that has been modified. Modifications can be audio and/or visual. For example, the user generated content can include known material that has been sped up, slowed down, flipped, cropped, zoomed in or out, included within a border, that includes a change in the coloring of the video, in dimensions and/or format, in aspect ratio, and/or other such modifications. An example of a visual modification can be the inclusion of a region of differing brightness, such as a bright line moving through the image. An example of an audio modification can be a break in the audio inserted every few seconds.

The media content sharing platforms 175A-B may engage with a media content identification service 170 hosted by server computing device 150. After a media content item is uploaded to the media content sharing platform 175A-B, the computing device 101A, 101B may send one or more identification request for the media content item to the server computing device 150 for identification by identification service 170. In one embodiment, a media content sharing platform 175A,B can provide an identification request for a media content item which has been uploaded by a user of the media content sharing platform. An identification request may include the media content item, one or more segments of the media content item (e.g., provided as a single file or multiple files), a digital fingerprint of the media content item (which is divisible into digital fingerprints of individual segments and/or can be sampled to determine portions of the digital fingerprint that correspond to particular segments of the media content item), digital fingerprints of one or more segments of the media content item, an identification of an account or channel associated with the media content item (e.g., a channel to which the media content item was posted or a user account on which the media content item was posted), and/or other information related to the media content item.

Digital fingerprints are compact digital representations of a media content item (or a segment of a media content item) extracted from a media content item (audio and/or video) which represent characteristics or features of the media content item (or segment of the media content item) with enough specificity to uniquely identify the media content item (or segment of the media content item). Fingerprinting algorithms encapsulate features such as frame snippets, motion and music changes, camera cuts, brightness level, object movements, loudness, pitch, brightness, spectral bandwidth, energy in one or more spectral bands, spectral steadiness, Mel-frequency cepstral coefficients (MFCCs), and so on. The fingerprinting algorithm that is used may be different for audio media content items and video media content items.

Examples of other information related to the media content item, which may be included in the identification request, includes metadata such as an indication of a type or class of channel to which the media content item was posted (e.g., a music channel, a gaming channel, a news channel, etc.), a transcription of the media content item (e.g., lyrical information), metadata indicating a length of the media content item, metadata indicating a date and time of an upload of the media content item, and so on. The identification request may be for one or more particular segment(s) of the uploaded media content item, or may be for an entirety of the media content item. For example, the media content sharing platform may determine segments of the media content item to be tested, and may send separate identification requests to the identification service 170 for each of the segments, where each identification request includes a different segment of the media content item and/or a digital fingerprint of a different segment of the media content item. In another example, the media content sharing platform 175A, 175B may send a single identification request for an entire media content item.

In some embodiments, the computing device or devices 101A, 101B host a local identification client 190A, 190B that is associated with the identification service 170. In some embodiments, the media content sharing platform 175A, 175B sends one or more identification request for an uploaded media content item to the identification client 190A, 190B for identification. The identification request may be for a segment of a media content item, multiple segments of a media content item, or an entirety of a media content item, and may include any of the aforementioned data. The identification client 190A, 190B may then perform one or more operations locally at the computing devices 101A, 101B, such as generating digital fingerprints, processing one or more segments of the media content item using a trained machine learning model to classify those segments as containing or not containing music, processing the media content item using a trained machine learning model to determine an amount of music in the media content item, processing the media content item using a trained machine learning model to determine whether it has been modified from a prior version and/or to identify modification (s) present in the media content item, performing operations to reverse the identified modification(s) to generate an updated media content item, generating digital fingerprints of the updated media content item, and/or checking the digital fingerprints of the updated media content item against a local database of digital fingerprints of known media content items. Examples of machine learning models that may be used include neural networks (e.g., deep neural networks, convolutional neural networks, multilayer perceptrons (MLP), recurrent neural networks (RNN), or other variants or hybrid versions of such), support vector machines, random forests (e.g., an ensemble of decision trees), and so on.

The identification client 190A, 190B may additionally or alternatively forward the transaction request (or a new request) on to identification service 170. In one example, identification client 190A, 190B may receive an identification request to identify any known material in an entire media content item, may determine one or more segments of the media content item to be tested, and may send separate requests to identification service 170 for each of those segments. Identification client 190A-B may be configured to extract information from unidentified media content items and to send such extracted information to identification service 170 and to otherwise communicate with identification service 170. Such extracted content may include lyrical content, one or more digital fingerprints, one or more features (e.g., feature vectors), and so on. Identification client 190A-B may alternatively or additionally be configured to send unidentified media content items or portions thereof to identification service 170. Additionally, or alternatively, the identification client 190A, 190B may process unidentified media content items to determine whether those unidentified media content items contain music and/or to determine an amount of music contained in the unidentified media content items. In some embodiments, identification client 190A, 190B performs additional operations and/or sends data to identification service if the unidentified media content items contain music or a threshold amount of music. Identification clients 190A-B may optionally include a media classifier 152, a modification identifier 153, and/or a media identifier 160 in embodiments.

Server computing device 150 includes a media content identification service 170 that can identify known material contained within media content items. Original media content items (e.g., known copyrighted works such as recorded performances) may be registered to the identification service 170, which may include generating a plurality of segments of the original media content item and/or generating digital fingerprints for each of the plurality of segments. In one example, a digital fingerprint of an entire media content item of a known work may be generated. The digital fingerprint may include a different smaller digital fingerprint (e.g., feature vector or set of features) for each timestamp of the known media content item. The digital fingerprint may be divided into smaller digital fingerprints of segments of the known media content item as is convenient for comparison to digital fingerprints of unidentified media content items.

In an embodiment, the media content identification service 170 includes a media identifier 160, a licensing logic 162, a communication logic 164, a media classifier 152, modification identifier 153, and/or a media labeler 178. Alternatively, the identification service 170 may not include some of these components and/or the functionality of some of these components may be combined.

The server computing device 150 may communicate with storages 145A-C that store known media content items 147A-B and/or channel/account content 143. The storages 145A-C can be magnetic storage units, optical storage units, solid state storage units, storage servers, or similar storage units. The storages 145A-C can be monolithic devices or a distributed set of devices. A 'set,' as used herein, refers to any positive whole number of items including one. In some embodiments, the storages 145A-C may part of a SAN, NAS or storage service. As shown, known media content items 147A, known media content items 147B, and channel/account content 143 are all stored in separate storage. However, it should be understood that the same storage may be used to store some or all of such data.

The known media content items 147A-B may be media content items that have a known identification. Additionally, one or more digital fingerprints of the known media content items 147A-B may be stored in storages 145A-B. The digital fingerprints may be digital fingerprints of entire known media content items (e.g., known works such as recorded performances that have been registered with the identification service 170 for copyright protection), and/or may be digital fingerprints of segments of such known media content items. Each digital fingerprint may be subdivided into smaller digital fingerprints of segments or sub-segments of a known media content item (e.g., into digital fingerprints of multiple overlapping segments of the known media content item) for comparison to digital fingerprints of segments of unknown media content items (e.g., fingerprints of segments of UGC).

Licensing information about the known media content items 147A-B may also be stored. Metadata associated with the known media content items 147A-B may also be stored.

The communication logic 164 may send and receive data associated with media content items to be analyzed or that have been analyzed. The data may be received from a remote computing device (e.g., a media content sharing platform 175A-B and/or identification client 190A, 190B running on a remote computing device 101A-B).

Data sent by the identification client 190A-B and received by the identification service 170 may be or include a transaction request for identifying an unidentified media content item and an entire media content item (e.g., an entire file), one or more segments of a media content item, a set of features of a media content item (e.g., one or more digital fingerprint of the media content item), a set of features of a segment of a media content item (e.g., one or more digital fingerprint of a segment of the media content item), lyrical contents of a media content item, a classification of the media content item (e.g., as containing music, as not containing music, or as containing a low quantity, medium quantity or large quantity of music), and/or metadata associated with the media content item. In some embodiments, received data is stored in one or more of storages 145A-E.

In one embodiment, media classifier 152 classifies an unknown media content item as containing music or as not containing music. In one embodiment, media classifier 152 determines whether an unknown media content item contains foreground music, background music, or no music. Additionally, media classifier 152 may determine different classifications for different portions of an unidentified media content item. For example, media classifier 152 may identify minutes 0-15 of an unidentified media content item as containing music and may further identify minutes 16-90 of the unidentified media content item as not containing music. Media classifier 152 may also determine an amount of music contained in a media content item. For example, the media classifier 152 may identify a media content item as containing no music, a small amount of music, a medium amount of music, or a large amount of music. A media content item may be classified as containing a small amount of music if a first threshold percentage (e.g., up to 20%) of the media content item contain music. A media content item may be classified as containing a medium amount of music if more than the first threshold percentage of the media content item and less than a higher second threshold percentage (e.g. up to 40%) of the media content item contains music. A media content item may be classified as containing a large amount of music if greater than the second threshold percentage of the media content item contains music.

Media classifier 152 may be further configured to determine additional classifications for unidentified media content items (or portions or segments thereof) that contain music. For example, media classifier 152 may classify unidentified media content items based on music genre (e.g., rock, punk, heavy metal, pop, R&B, and so on).

Additionally, or alternatively, media classifier 152 may determine a portion and/or amount of the of the unknown media content item that contains audio and a portion and/or amount of the unknown media content item that does not include audio (e.g., for which there is silence on the audio track). Those portions that contain audio may then be further analyzed to determine whether the audio includes music. Alternatively, those portions that contain audio may be tested under the assumption that they contain music without separately analyzing them to determine if they do contain music.

In addition to performing classification of audio components of media content items, media classifier 152 may additionally or alternatively perform classification of video components of media content items. In one embodiment, media classifier 152 classifies an unknown media content item as containing static video or as containing dynamic video. For example, media classifier may determine whether a video component of the media content item is dynamic (e.g., contains moving objects) or is static (e.g., does not contain moving objects). Additionally, media classifier 152 may determine different classifications for different portions of an unidentified media content item. For example, media classifier 152 may identify minutes 0-15 of an unidentified media content item as containing static video and may further identify minutes 16-90 of the unidentified media content item as containing dynamic video. Media classifier 152 may also determine an amount of static video vs. dynamic video that is contained in the media content item. For example, the media classifier 152 may identify a media content item as containing no static video, a majority dynamic video, a majority static video, or no dynamic video. If a media content item contains no dynamic video or mostly static video, then the audio component of the media content item may be more important, and the audio component of the media content item may be analyzed more closely (e.g., with a greater testing frequency) and the video component of the media content item may be analyzed less closely (e.g., with a reduced testing frequency).

In another embodiment, media classifier 152 may analyze the video component of a media content item to classify the media content item (or one or more segments of the media content item) as containing a talking head (e.g., a talking person) or as not containing a talking head. Long segments of video that contain a talking head may have a decreased likelihood of containing a copy of a movie and/or may have an increased likelihood of containing a copy of a news broadcast, for example. In one embodiment, media classifier 152 includes one or more trained machine learning models or profiles (e.g., trained convolutional neural networks) that have been trained to classify input media content items. In some embodiments the one or more trained machine learning models are trained to receive an audio file, embedding of an audio file, portion of an audio file, or embedding of a portion of an audio file as an input. Examples of machine learning models that may be used include neural networks (e.g., deep neural networks, convolutional neural networks, multilayer perceptrons (MLP), recurrent neural networks (RNN), or other variants or hybrid versions of such), support vector machines, random forests (e.g., an ensemble of decision trees), and so on.

In one embodiment, identification service 170 does not perform further processing of media content items (or portions thereof) that do not contain music or contains very little music. If a media content item fails to contain music, then the identification service 170 may respond to the identification client 190A-B with a response to the transaction request indicating that there is no music contained in the unidentified media content item and/or that the unidentified media content item fails to include any known music.

Modification identifier 153 is configured to determine whether a media content item has been modified from an original or prior version. In some embodiments, the modification identifier 153 can be implemented on computing devices 101A,B. In some embodiments, the modification identifier 153, or parts thereof, can be implemented on server computing device 150. For example, computing devices 101A,B can extract audio and/or video features from a media content item, and send the features to server computing device 150. Modification identifier 153 can determine whether the media content item has been modified and/or identify the modification(s) present in the media content item. In some embodiments, modification identifier 153 can send the identified modification(s) to computing devices 101A,B, and the computing devices 101A,B can generate an updated media content item by reversing the identified modification(s). Computing devices 101A,B can then determine whether the updated media content item contains known works.

In one embodiment, modification identifier 153 can determine whether a media content item has been modified by analyzing spectral and/or temporal features of the media content item. The modification identifier 153 can use a rule (or set of rules) to determine whether and/or how a media content item has been modified. The rules can include threshold value(s) of audio and/or temporal features, and their corresponding modification values. For example, the modification identifier 153 can analyze the energy in the audio spectrum of the media content item to identify how much of the energy is in a high frequency. A high frequency can be a frequency that is above a threshold frequency level. If a certain amount of the energy in the audio spectrum of the media content item is above a threshold (e.g., more than a certain percentage of the energy in the audio spectrum of the media content item is above the threshold frequency level), the modification identifier 153 can determine that the audio has likely been sped up. The modification identifier 153 can then perform one or more operations to reverse the identified modifications. That is, the modification identifier 153 can perform an operation to slow down the audio, to generated an updated media content item.

As an illustrative example, the modification identifier 153 can measure the overall spectral centroid of a media content item. If the overall spectral centroid measurement is above a predefined threshold, the modification identifier 153 may determine that the audio of the media content item was sped up by a corresponding predefined amount. That is, the predefined threshold can correspond to a sped-up factor. There can be more than one predefined threshold value, each corresponding to a unique sped-up factor. Thus, if the overall spectral centroid measurement is above a first predefined threshold value but below a second predefined threshold value, then the modification identifier 153 can determine that the audio has been sped up by a value corresponding to the first predefined threshold value. If the overall spectral centroid measurement is above both the first predefined threshold value and the second predefined threshold value, then the modification identifier 153 can determine that the audio has been sped up by a value corresponding to the second predefined threshold value. The modification identifier 153 can then perform one or more operations to reverse the audio modification (e.g., by either slowing down or speeding up the media content item). Note that the modification identifier 153 can analyze temporal features of the media content item in a similar fashion, to determine whether the media content item has been modified. In some embodiments, the modification identifier 153 can combine the spectral and temporal features of the media content item to determine whether the media content item has been modified.

In some embodiments, the modification identifier 153 can identify a modified video content item by analyzing only the audio portion of the video media content item. That is, if a certain percentage of the energy of the audio spectrum of a video content item is above a threshold frequency level, the modification identifier 153 can determine that the video content item has been altered, and can perform operations to reverse the modification of the video content item to generate the updated media content item.

As an illustrative example, the modification identifier 153 can cross-correlate of a video content item with frames containing one or more flipped letters to determine whether the video content item has been flipped. In some embodiments, the modification identifier 153 can cross-correlate the video content item to a groups of frames containing flipped letters, each group flipped to varying degrees (e.g., the first group can represent letters that are flipped 180 degrees, the second group can represent letters flipped 145 degrees, etc.). The groups of frames used for cross-correlation can also include flipped versions of other known objects, such as a clock, numbers, street lights, traffic signals, vehicles, houses, buildings, trees, flowers, animals, etc. the modification identifier 153 can then perform operations to reverse the modification corresponding to the identified modification. For example, the modification identifier 153 can determine that the frame(s) in the video content item have been flipped 145 degrees, and can perform an operation to flip the frames back to their original orientation.

In one embodiment, modification identifier 153 can include one or more trained machine learning model that have been trained to determine whether a media content item has been modified, and/or to identify modification(s) present in the media content item. In some embodiments, the one or more trained machine learning models are trained to receive an audio or video file, embedding of an audio or video file, portion of an audio or video file, or embedding of a portion of an audio or video file as an input. Examples of machine learning models that may be used include neural networks (e.g., deep neural networks, convolutional neural networks, multilayer perceptrons (MLP), recurrent neural networks (RNN), or other variants or hybrid versions of such), support vector machines, random forests (e.g., an ensemble of decision trees), and so on.

In some embodiments, the trained machine learning models are trained to receive one or more embeddings generated from an audio or video portion of a media content item (e.g., of an audio or video file). In machine learning, an embedding refers to a projection of an input into another, more convenient representation space. For example, a digital fingerprint and/or a set of features of a media content item or of a portion of a media content item may be an embedding. In some embodiments, an embedding can be a compressed, one-dimensional feature vector representing multiple frequencies (or frequency bands) over a particular time period. The trained machine learning model may output, for each class that is has been trained to identify, a likelihood that the media content item (or portion of the media content item) belongs to that class. For example, each class may correspond to a modification, and a trained machine learning model may be trained to output a likelihood for each modification. For example, each class may correspond to a speed rate of the media content item, and the trained machine learning model may output a likelihood that the media content item has been sped up (or slowed down) for each speed rate.

Modification identifier 153 can then reverse the identified modification(s) to generate an updated media content item. Modification identifier 153 can identify the modification that has the highest likelihood of being present. That is, the modification identifier 153 can identify, from the output the trained machine learning model, the class that has the highest likelihood value. The modification identifier 153 can then perform one or more operations to reverse the modification corresponding to the identified class with the highest likelihood. As an illustrative example, the class with the highest likelihood can be a speed rate of 1.5. Thus, the modification identifier 153 can slow down the audio and/or video in the media content item by the reciprocal of 1.5 to generate an updated media content item. In some embodiments, the modification identifier 153 can identify modified video content using the audio portion of the video media content item. That is, the modification identifier 153 can analyze, using the machine learning model, the audio portion of the video content item to determine whether the video content item has been modified. The modification identifier 153 can then reverse the identified modification(s) for the video content item, to generate an updated media content item.

In some embodiments, a media content item is divided into multiple sequential segments, and the multiple sequential segments are processed in turn by the trained machine learning model(s). In some embodiments, the trained machine learning model may not process each of the multiple sequential segments if a modification is identified in one of the segments. That is, modification identifier 153 can reverse, for the entire media content item, the modification(s) identified from one of the segments.

Media identifier 160 is configured to determine matches or near matches between unidentified media content items (or segments or portions thereof) and known media content items (or segments or portions thereof) based on comparisons of digital fingerprints. The unidentified media content items can be updated media content items, i.e., media content items for which modification identifier 153 has identified and reversed modification(s) on the media content item. When such a match or near match is made between an unidentified media content item and a known media content item, then it can be concluded that a segment of unidentified media content item contains an instance of the known media content item. When a match or near match is made between a) a portion of the unidentified media content item and all or a portion of a known media content item or b) an unidentified media content item and a portion of a known media content item, then it can be determined that the unidentified media content item contains at least a portion of the known media content item. In both instances, there may be licensing and/or take-down rules to implement. In one embodiments, the techniques discussed for identifying the contents of media content items as discussed in U.S. application Ser. No. 16/940,296, filed Jul. 27, 2020, are applied. The contents of U.S. application Ser. No. 16/940,296 are incorporated by reference herein in their entirety.

In one embodiment, the operations of media classifier 152 are skipped, and modification identifier 153 may perform identification of modifications of media content items responsive to any transaction requested from identification clients 190A-B or media content sharing platforms 175A, 175B without a classification having been performed on the unidentified media content item associated with the transaction request.

The media identifier 160 may be configured to determine whether a received media content item includes a copy of at least a portion of a known media content item. In some embodiments, the media identifier 160 can generate a digital fingerprint (or multiple digital fingerprints) of the updated media content item. The digital fingerprint (or multiple digital fingerprints) of the updated media content item may be compared against the digital fingerprints of all known works registered with identification service 170, or against a subset of all known works (e.g., with popular works). Digital fingerprints generated for a registered work are stored (optionally along with content metadata) in a repository such as a database. For example, digital fingerprints of known media content items 147A-B may be stored along with or in the place of the actual known media content items 147A-B.

In one embodiment, the updated media content item is divided into a plurality of segments, and a respective digital fingerprint is generated for each segment. Alternatively, a single larger digital fingerprint may be generated of the media content item, which may be subdivided into smaller digital fingerprints of individual segments. This process may have been performed by identification client 190A-B. The segments may be overlapping or non-overlapping segments. The media identifier 160 compares some subset of the digital fingerprints of the updated media content item to a plurality of stored digital fingerprints, wherein each of the plurality of stored digital fingerprints is associated with a respective known media content item of the known media content items 147A-B. The media identifier 160 determines, based on the comparing, whether one or more digital fingerprints of the updated media content item match digital fingerprints of a known media content item 147A-B. In one embodiment, if a threshold amount or contiguous length of the digital fingerprints of one or more segments of the updated media content item match digital fingerprints of a known media content item, then a match can be determined for that contiguous length.

In some embodiments, if a match between the updated media content item and a known work is not identified by the media identifier 160, the modification identifier 153 can generate a second updated media content item. The modification identifier 153 can identify, using the output of the trained machine learning model, the modification with the second highest likelihood of being present. The modification identifier 153 can perform an operation (or multiple operations) on the media content item to reverse the modification with the second highest likelihood of being present. The media identifier 160 can then try to identify a match between the second updated media content item and known works, to identify known material contained within the media content item. The modification identifier 153 is described in greater detail with respect to FIG. 2.

The identification service 170 may determine one or more actions to take with regards to a media content item (i.e., UGC) based on whether or not portions of that media content item, including portions of the updated media content item, match portions of known media content items (e.g., whether or not that media content item contains portions of copyrighted material), the identity or identities of the known media content items contained in the analyzed media content item and/or the amount of the known media content items contained in the analyzed media content item. For example, the media content item may be tagged as being or containing a specific known work (or multiple known works if there were matches of different segments of the analyzed media content item to different known works). Additionally, advertising may be applied to the media content item and licensing revenues may be attributed to the owner(s) of the rights to the known work(s) (e.g., by licensing logic 162) or the media content item may be removed from the media content sharing platform 175A-B.

If less than a threshold amount of the digital fingerprints of the updated media content item match digital fingerprints of any known media content item, then media identifier 160 may fail to identify any portion of the updated media content item. That is to say, the updated media content item does not include a copy of any portion of any known media content item (e.g., of any known song in a music database).

In some embodiments, identification clients 190A-B may include a media classifier 152, a modification identifier 153, a media identifier 160, and/or one or more other components of the identification service 170. These components may perform the same operations as described with reference to the like-named components of the identification service 170, but may perform such operations locally at the computing device 101A-B of the media content sharing platform 175A-B. In such embodiments, these operations may be performed at a site of the media content sharing platform 175A-B so as to minimize network bandwidth utilization. Media content sharing platform 175A-B may provide an unidentified media content item (or segment of the unidentified media content item, or extracted features of the unidentified media content item) to the identification client 190A-B for media content item identification prior to identification client 190A-B sending the unidentified media content item (or segment of the unidentified media content item, extracted features of the unidentified media content item or digital fingerprints of the unidentified media content item) across the network 131 to server computing device 150. Identification client 190A-B may identify the unidentified media content item as described above, including by identifying and reversing modification(s) in the unidentified media content item prior to comparing it to known works.

In some embodiments, media classification is performed by media classifier 152 running on identification client 190A-B, and further processing is only performed if the unidentified media content item contains music. In some embodiments, further processing is only performed for portions or segments of the unidentified media content item identified as containing music. Such further processing may include operations performed by the identification client 190A-B (e.g., generating digital fingerprints, determining lyrical content, etc.) and/or operations performed by identification service 170. In some embodiments, only those portions of the unknown media content item (e.g., UGC) that contain music are further analyzed to determine whether they contain copies of segments of known media content items.

In some embodiments, client computing device 101B includes or has access to a smaller library or repository of known media content items 142 (e.g., which may be stored in storage 140) as compared to the library or repository of known media content items 147A-147B. For example, known media content items 142 may be currently popular music. The known media content items 142 may include first and/or second digital fingerprints (e.g., for direct match determination and/or cover determination) of the known media content items 142. Identification client 190A,B may invoke modification identifier 153 and/or media identifier 160 to determine whether an unidentified media content item is or contains a copy of at least a portion of a popular known media content item of known media content items 142. If the media identifier 160 identifies a threshold number of segments or length or percentage of the unknown media content item that matches segments of known media content items 142, then identification client 190B may send one or more transaction requests to identification service 170 to have the unknown media content item (e.g., UGC) analyzed using the larger store of known media content items available to identification service 170.

Licensing logic 162 may determine a licensing rate that a media content sharing platform 178A-B is to pay for user generated content that is a cover of a particular known media content item. In one embodiment, licensing logic 162 determines a licensing rate to apply to a cover media content item based on licensing and royalty rates that may be applied to the cover media content item, which may be dependent on whether the same lyrics are used, on whether the same music is used, and so on.

Licensing logic 162 may be invoked to determine a publishing rights holder, performance rights holder and/or other rights holder of the known media content item(s) contained within UGC. Such rights holder information may be stored along with the known media content items 147A-147B within storage 145A-145B or may be stored in another storage location. The licensing logic 162 may query the storage 145A-145B for the rights holder information. Alternatively, the licensing logic 162 may query other storages or other sources, including external sources to determine the rights holder information.

Upon determining the rights holder information of the known media content item(s) contained in UGC, a resource allocation may be calculated for the identified media content item. In an embodiment, the licensing logic 162 may calculate resource allocation based upon rights holder information which may include licensing and/or royalty fees for media content items. In an embodiment, if the media content item contains data (e.g., music) from two or more known media content items, then licensing logic 162 may calculate a percentage based allocation between the rights holders of the two or more known media content items. The percentage based allocation may be based upon the percentage of the identified cover-media content item that matches each of the two or more known media content items.

Responsive to completing analysis/identification of an unknown media content item for which a request for identification was received from a media content sharing platform 175A-B, identification service 170 and/or identification client 190A-B may send an identification/analysis result back to the media content sharing platform 175A-B. The identification/analysis result may indicate which, if any, known media content items (e.g., copyrighted performances) are contained within the tested media content item, the modification(s) identified, the portion or percentage of the media content item that contains such known media content items, identification of rights holders, and/or other information. Upon determining that the unidentified media content item contains one or more known media content items, the licensing logic 162 may be invoked to determine a licensing rate to apply to the media content item (e.g., UGC). Such a licensing rate may also be reported back to the media content sharing platform 175A-B. In some instances, licensing logic 162 may determine that one or more of the known media content items whose contents are included in the UGC have takedown rules, the report may include an instruction to remove the UGC from the media content sharing platform 175A-B or to remove portions of the UGC from the media content sharing platform 175A-B.

Figure 2:
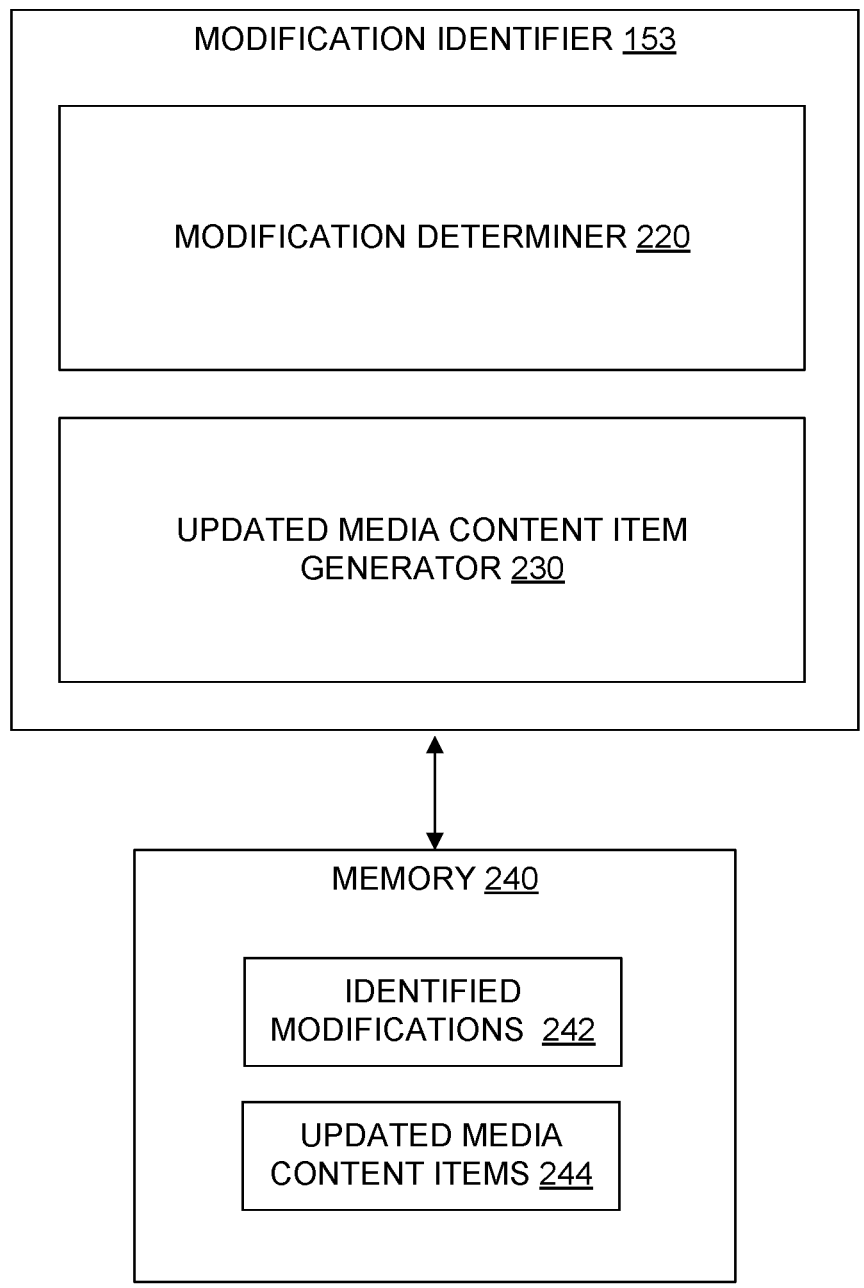
FIG. 2 is a block diagram illustrating a modification identifier, according to an embodiment.

FIG. 2 is a block diagram of an example modification identifier 153, in accordance with embodiments of the present disclosure. In general, the modification identifier 153 may correspond to the modification identifier 153 of server computing device 150 and/or of computing device 101B, as shown in FIG. 1. In an embodiment, the modification identifier 153 includes a modification determiner 220 and an updated media content item generator 230. In some embodiments, the modification determine 220 can be implemented by server computing device 150, and the updated media content item generator 230 can be implemented by a computing device 101A,B. Modification identifier 153 can be coupled to, or have access to, a memory 240, which can store identified modifications 242 and/or updated media content item 244. Alternatively, one or more logics and/or modules of the modification identifier 153 may be distinct modules or logics that are not component of modification identifier 153. Additionally, or alternatively, one or more of the modules or logics may be divided into further modules or logics and/or combined into fewer modules and/or logics.

In some embodiments, modification identifier 153 may receive a request to perform analysis of a media content item (e.g., UGC). The request may include a copy of the media content item, and/or may include an embedding of the media content item. In some embodiments, the request may include only the audio portion of a video content item, and/or an embedding of the audio portion of a video content item. Thus, in such embodiments, modification identifier 153 can identify modification(s) for a video content item using only the audio portion of the video content item. In some embodiments, modification identifier 153 can segment the received media content item into portions, and perform operations described below on the portions of the media content item.

Modification determiner 220 may be invoked to determine whether the media content item contains modifications from a prior version, and/or to identify the modification(s) likely to be present in the media content item. Modification determiner 220 may provide a representation of the media content item as input to a machine learning model that is trained to identify modification(s) in a media content item. The representation of the media content item can be an embedding of the media content item, such as a compressed one-dimensional feature vector representing multiple frequencies (or frequency bands) over a particular time period (e.g., 3 seconds). Modification determiner 220 may receive, as output from the machine learning model, an indication of whether the media content item contains one or more modifications. In some embodiments, the indication can be a vector representing classifications corresponding to a number of modifications. Each value in the vector can represent a likelihood that the corresponding modification is present in the media content item. In some embodiments, the indication can be a value representing a particular modification likely to be present in the media content item. The machine learning model is further described with represent to FIG. 3.

In some embodiments, the modification determiner 220 can compare the value(s) in the indication received as output from the machine learning model to threshold value(s) to determine whether a corresponding modification is present. For example, if the output of the machine learning model is a vector of values, each representing a likelihood that a corresponding modification is present, modification determiner 220 can identify the values in the vector that are above a threshold (e.g., above 51%) as the modification(s) that are likely to be present in the media content item. In some embodiments, modification determiner 220 can rank the modification(s), e.g., from most likely to be present (i.e., has the highest likelihood) to least likely to be present (i.e., has the lowest likelihood). In some embodiments, modification determiner 220 may rank only the modification(s) that are above the threshold. Modification determiner 220 can store the identified (and optionally ranked) modification(s) in identified modifications 242. In some embodiments, all of the values in the output vector may fall below the threshold, in which case the modification determiner 220 may determine that the media content item has not been modified from a prior version (or at least not significantly modified), and media identifier 160 can compare the media content item to known works to determine whether known material is contained therein.

In some embodiments, the output from the machine learning model may be a single value representing the modification present in the media content item. Modification determiner 220 may store the output value in identified medications 242. In some embodiments, modification determiner 220 may store the value if it is above a threshold value. For example, the output value may indicate that the media content item has been sped up by a factor of 1.1 (i.e., 1.1 times the original speed). This factor value (in this example 1.1) may be below a threshold value, in which case the media content item can be compared to known works without first reversing the identified modification. Thus, modification determiner 220 may determine that the media content item has not been modified from a prior version (or at least not significantly modified), and media identifier 160 can compare the media content item to known works to determine whether known material is contained therein.

Updated media content item generator 230 may be invoked to generate an updated media content item by performing one or more operations to reverse the identified modification(s). In some embodiments, updated media content item generator 230 may identify a modification from the identified modifications 242 that has the highest likelihood, and perform operation(s) to reverse the identified modification. Operations to reverse the identified modification can include, for example, modifying the audio to its original rate, pitch, and/or tempo, rotating the image to its original position, zooming in or out, flipping the image and/or video, and/or panning back the video. For example, the modification that has the highest likelihood may correspond to a speed-up rate of 1.6 times the original speed. Thus, the updated media content item generator 230 can perform operations to reverse the 1.6 speed-up modification. Such operations can include, for example, resampling the audio to a different sample rate, which in this example may be the reciprocal of 1.6, to bring the audio back to its original sampling rate. The operations can also include correcting the pitch, for example, as sped up audio can affect the pitch of the audio. Other operations can be performed to reverse the identified modification. Updated media content item generator 230 can store the updated media content item in updated media content items 244.

Modification identifier 153 may then invoke media identifier 160 of FIG. 1 to determine matches (or near matches) between the updated media content item and known media content items (e.g., based on comparisons of digital fingerprints). Media identifier 160 may not identify a match, in which case modification identifier 153 may be invoked to identify and reverse the next most likely modification in the media content item. Updated media content item generator 230 can identify the next most likely modification from identified modifications 242, and can perform operations to reverse the next most likely modification to generate an additional updated media content item. Updated media content item generator 230 can store the additional updated media content item in updated media content items 244. Media identifier 160 can be invoked to determine matches (or near matches) between the additional updated media content item and known content items. Updated media content item generator 230 can continue to generate additional updated media content items until a match is found, until all the modifications have been reversed, or until all the modifications that are above a threshold likelihood have been reversed. In some embodiments, each additional updated media content item can be based on the original UGC. That is, updated media content item generator 230 performs operations on the media content item received in the request to perform analysis of a media content item (e.g., UGC). In some embodiments, the updated media content item generator 230 can perform operations to reverse the additional identified modification(s) on the previously updated media content item stored in updated media content items 244. For example, the output of the machine learning model may indicate a 75% likelihood that the audio of a video file has been sped up by a factor of 1.5, and a 73% likelihood that the images of the video file have been flipped. Thus, performing operations to reverse the 1.5 speed-up rate of the audio, if the media identifier 160 did not identify a match, the updated media content item generator 230 can perform operations to reverse the image flip modification on the updated media content item (i.e., the slowed down version of the media content item).

Figure 3:
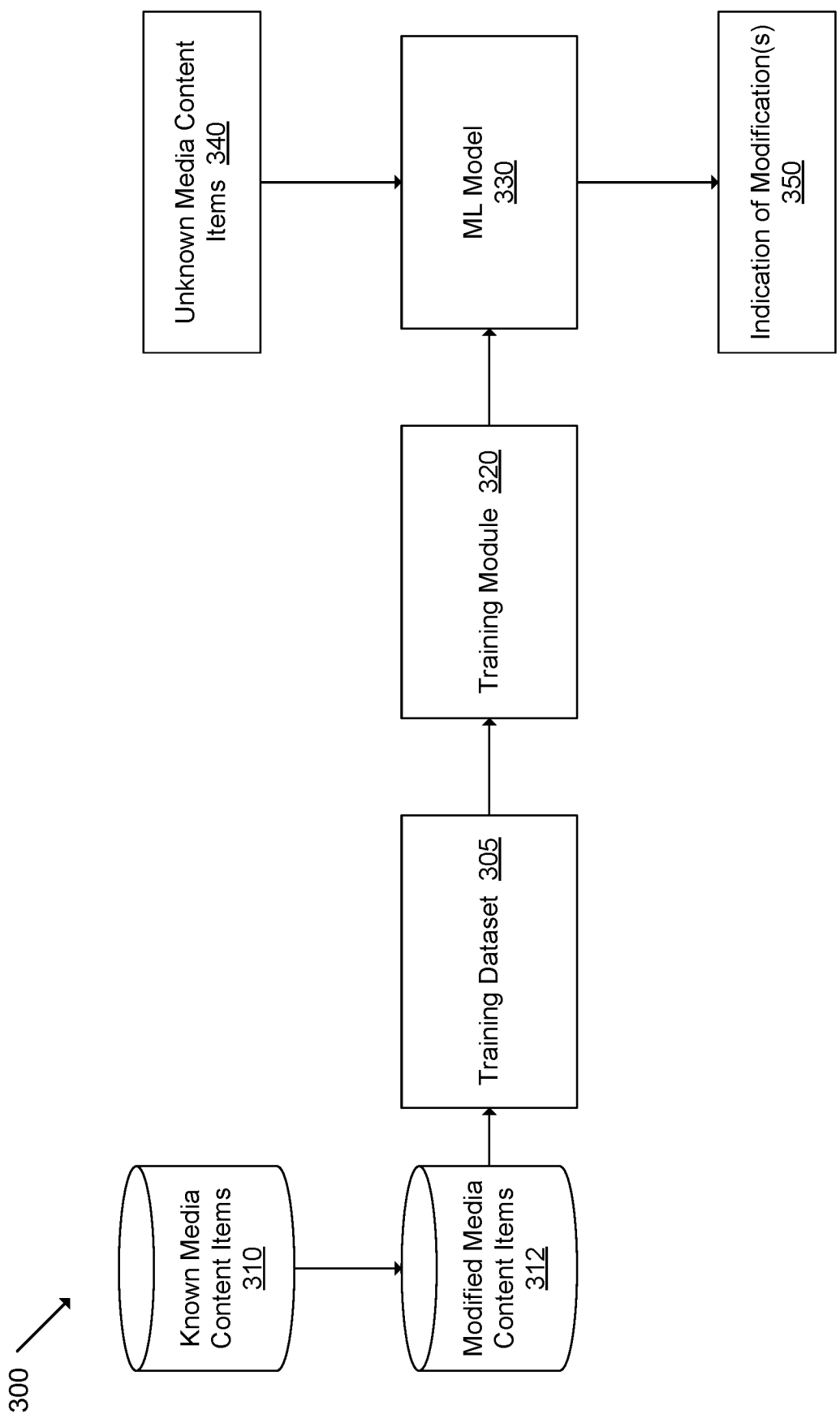
FIG. 3 is a workflow diagram for training a machine learning model, according to an embodiment.

FIG. 3 is a workflow 300 for training a machine learning model identify modification(s) in a media content item, in accordance with embodiments of the present disclosure. The workflow 300 may be performed by processing logic executed by a processor of a computing device. The workflow 300 may be implemented, for example, by one or more modification identifier 153 executing on a processing device 602 of computing device 600 show in FIG. 6. Additionally, FIGS. 4 and 5 describe example operations and/or methods associated with training and/or applying a trained machine learning model to identify modification(s) in a media content item. The operations and/or methods described with reference to FIG. 3 may be performed by processing logic that may comprise hardware (e.g., circuitry, dedicated logic, programmable logic, microcode, etc.), software (e.g., instructions run on a processing device to perform hardware simulation), or a combination thereof.

Training dataset 305 can contain hundreds, thousands, tens of thousands, hundreds of thousands, or more, modified media content items 312. Modified media content items 312 can represent a number of media content items that have been modified from their original version. Examples of modifications include content modification, alteration and/or obfuscation, such as compression, aspect ratio changes, re-sampling, change in color, dimensions, format, bitrates, equalization, and/or content degradation (e.g., distortion due to conversion, loss in quality, blurring, cropping, addition of background noise, etc.).

To construct the training dataset 305, processing logic generates training input and target output for the training input. The training input can include media content items that have been modified. In some embodiments, the training dataset 305 can include media content items that have one type of modification, such as a modification in the speed (e.g., either slowed down or sped up), and the training module 320 can train a machine learning model 330 to identify that type of modification (in this example, speed modifications). Training dataset 305 can include multiple sets of training data, each set corresponding to a particular type of modification (e.g., compression, aspect ratio changes, change in color, dimensions, format, speed, etc.). Training module 320 can train a machine learning model 330 for each type of modification. In some embodiments, training dataset 305 can include media content items that have more than one type of modification, and the training module 320 can train a machine learning model 330 to identify multiple types of modifications.

The training dataset 305 is provided as input to a training module 320 to train a machine learning model 330. One type of machine learning model 330 that may be used is an artificial neural network, such as a deep neural network. Artificial neural networks generally include a feature representation component with a classifier or regression layers that map features to a desired output space. A convolutional neural network (CNN), for example, hosts multiple layers of convolutional filters. Pooling is performed, and non-linearities may be addressed, at lower layers, on top of which a multi-layer perceptron is commonly appended, mapping top layer features extracted by the convolutional layers to decisions (e.g. classification outputs). Deep learning is a class of machine learning algorithms that use a cascade of multiple layers of nonlinear processing units for feature extraction and transformation. Each successive layer uses the output from the previous layer as input. Deep neural networks may learn in a supervised (e.g., classification) and/or unsupervised (e.g., pattern analysis) manner. Deep neural networks include a hierarchy of layers, where the different layers learn different levels of representations that correspond to different levels of abstraction. In deep learning, each level learns to transform its input data into a slightly more abstract and composite representation. In an image recognition application, for example, the raw input may be a matrix of pixels; the first representational layer may abstract the pixels and encode edges; the second layer may compose and encode arrangements of edges; the third layer may encode higher level shapes (e.g., teeth, lips, gums, etc.); and the fourth layer may recognize a scanning role. Notably, a deep learning process can learn which features to optimally place in which level on its own. The "deep" in "deep learning" refers to the number of layers through which the data is transformed. More precisely, deep learning systems have a substantial credit assignment path (CAP) depth. The CAP is the chain of transformations from input to output. CAPs describe potentially causal connections between input and output. For a feedforward neural network, the depth of the CAPs may be that of the network and may be the number of hidden layers plus one. For recurrent neural networks, in which a signal may propagate through a layer more than once, the CAP depth is potentially unlimited.

Training of a neural network and other types of machine learning models may be achieved in a supervised learning manner, which involves feeding a training dataset consisting of labeled inputs through the network or other model, observing its outputs, defining an error (by measuring the difference between the outputs and the label values), and using techniques such as deep gradient descent and back-propagation to tune the weights of the network or other model across all its layers and nodes such that the error is minimized. In many applications, repeating this process across the many labeled inputs in the training dataset yields a network that can produce correct output when presented with inputs that are different than the ones present in the training dataset. In high-dimensional settings, such as large images, this generalization is achieved when a sufficiently large and diverse training dataset is made available.

A training dataset containing hundreds, thousands, tens of thousands, hundreds of thousands or more data points can be used to form the training dataset 305. In embodiments, up to millions of modified media content items are included in a training dataset. Each data point may include, for example, a representation of a modified media content item. The representation can be, for example, a two-dimensional vector representation of a video, or a one-dimensional vector representation of audio. The data can also include anonymized user information data from the system (e.g., from the channel and/or media content sharing platform). The variables in the data can correspond to a number of modifications, such as modifications in aspect ratio, color, format, dimensions, speed, cropping, addition of background noise and/or color, etc. This data may be processed to generate one or multiple training datasets 305 for training of one or more machine learning models 330. The machine learning models 330 may be trained, for example, to output probabilities of values of one or more modifications of a media content item.

In one embodiment, generating a training dataset 305 includes generating a representation of a modified media content item 312. The representation of a modified media content item 312 can be a one-dimensional feature vector that represents frequencies over a particular time period. That is, generating the training dataset 305 can include performing statistical analyses on a spectrogram representation of the media content item to produce a one-dimensional feature vector representation of the media content item. In some embodiments, the training dataset 305 can include two-dimensional feature vector representations of the media content items, and/or some other representation of the media content item. The target output may depend on what the ML model 330 will be trained to do. For example, to train a machine learning model 330 to predict a likelihood of one or more modifications, the target output can be a vector of values, each value associated with one of the one or more modifications. Each value can represent the likelihood that the corresponding modification is present in the media content item. Each value can be a number between 0 and 1. Higher numbers can represent a higher likelihood that the corresponding modification is present in the media content item.

To effectuate training, the training dataset 305 is provided as input to the training module 320 to train ML model 330. Prior to inputting a first input into a machine learning model 330, the machine learning model may be initialized. Processing logic trains the untrained machine learning model based on the training dataset(s) 305 to generate a trained machine learning model 330 that perform various operations as set forth above.

Training may be performed by inputting one or more of the data points into the machine learning model one at a time. Each input may include modified media content items. The data that is input into the machine learning model may include a single layer or multiple layers. In some embodiments, a recurrent neural network (RNN) is used. In such an embodiments, a second layer may include a previous output of the machine learning model (which resulted from processing a previous input).

The machine learning model processes the input to generate an output. An artificial neural network includes an input layer that consists of values in a data point (e.g., intensity values and/or height values of pixels in a height map). The next layer is called a hidden layer, and nodes at the hidden layer each receive one or more of the input values. Each node contains parameters (e.g., weights) to apply to the input values. Each node therefore essentially inputs the input values into a multivariate function (e.g., a non-linear mathematical transformation) to produce an output value. A next layer may be another hidden layer or an output layer. In either case, the nodes at the next layer receive the output values from the nodes at the previous layer, and each node applies weights to those values and then generates its own output value. This may be performed at each layer. A final layer is the output layer, where there is one node for each class, prediction and/or output that the machine learning model can produce. For example, for an artificial neural network being trained to predict one or more modifications, each class may correspond to one of the modifications. Alternatively, or additionally, for an artificial neural network trained to predict the modification(s), the machine learning model may output a predicted modification. Accordingly, the output may include one or more prediction and/or one or more a likelihood of a modification being present in the media content item.

Processing logic may then compare the generated prediction and/or other output to the known condition and/or label that was included in the training data item. Processing logic determines an error (i.e., a classification error) based on the differences between the output likelihood map and/or label(s) and the provided likelihood map and/or label(s). Processing logic adjusts weights of one or more nodes in the machine learning model based on the error. An error term or delta may be determined for each node in the artificial neural network. Based on this error, the artificial neural network adjusts one or more of its parameters for one or more of its nodes (the weights for one or more inputs of a node). Parameters may be updated in a back propagation manner, such that nodes at a highest layer are updated first, followed by nodes at a next layer, and so on. An artificial neural network contains multiple layers of "neurons," where each layer receives as input values from neurons at a previous layer. The parameters for each neuron include weights associated with the values that are received from each of the neurons at a previous layer. Accordingly, adjusting the parameters may include adjusting the weights assigned to each of the inputs for one or more neurons at one or more layers in the artificial neural network.

Once the model parameters have been optimized, model validation may be performed to determine whether the model has improved and to determine a current accuracy of the model. After one or more rounds of training, processing logic may determine whether a stopping criterion has been met. A stopping criterion may be a target level of accuracy, a target number of processed data items from the training dataset, a target amount of change to parameters over one or more previous data points, a combination thereof and/or other criteria. In one embodiment, the stopping criteria is met when at least a minimum number of data points have been processed and at least a threshold accuracy is achieved. The threshold accuracy may be, for example, 70%, 80% or 90% accuracy. In one embodiment, the stopping criteria is met if accuracy of the machine learning model has stopped improving. If the stopping criterion has not been met, further training is performed. If the stopping criterion has been met, training may be complete. Once the machine learning model is trained, a reserved portion of the training dataset may be used to test the model 330. Testing the model 330 can include performing unit tests, regression tests, and/or integration tests.

Once the ML model 330 has been trained, the modification identifier 153 may use the ML model 330 to identify modification(s) within a unknown media content items 340. That is, modification identifier 153 may provide, as input to ML model 330, one or more unknown media content items 340. ML model 330 may provide, as output, an indication of modification(s) 350 for each unknown media content item 340. In some embodiments, the indication of modification(s) 350 can be a value corresponding to a specific modification. ML model 330 may be a ML regression model trained to provide a value corresponding to a particular modification. For example, ML model 330 may be trained to provide a value corresponding to a speed modification of the unknown media content item 340. The value may be used by updated media content item generator 230 to generate an updated media content item with the speed modification reversed.

In some embodiments, the indication modification(s) 350 may be a vector of values, each value corresponding to a class. ML model 330 may be a ML classifier model trained to provide a likelihood for each class in the vector. The likelihood can represent the likelihood that the modification corresponding to the class is present in the unknown media content item 340. For example, ML model 330 may be trained to provide a value for each class corresponding to a particular speed rate of the unknown media content item 340. For example, the indication of modification(s) 350 output can be a vector of 16 values corresponding to speed rates, ranging from 0.5-2.0. Thus, the first value in the output vector can provide a likelihood that the unknown media content item 340 has a speed rate of 0.5 times of a prior version of the media content item, the second value in the output vector can provide a likelihood that the unknown media content item 340 has a speed rate of 0.6 times of a prior version of the media content item, the third value in the output vector can provide a likelihood that the unknown media content item 340 has a speed rate of 0.7 times of a prior version of the media content item, and so on. Thus, the updated media content item generator 230 can generate an updated media content item by performing operations to reverse the modification with the highest likelihood value in the output vector, as further described with respect to FIG. 2.

Multiple ML models 330 can be trained and used in combination. For example, one ML model 330 can be trained and used to identify speed modification(s) in an unknown media content item 340, a second ML model 330 can trained and used to identify pitch modification(s) in the same (and/or another) unknown media content item 340, a third ML model 330 can be trained and used to identify image modification(s) in the same (and/or another) unknown media content item 340, etc. Each ML model 330 can be trained using a different training algorithm, as described above. For example, the ML model 330 trained to identify speed modification(s) can be a classifier ML model, while the ML model 330 trained to identify image modification(s) can be a regression ML model (or vice versa). There is no limit to the number of ML models 330 that can be trained and used to identify modification(s) in unknown media content items 340.

Figure 4:
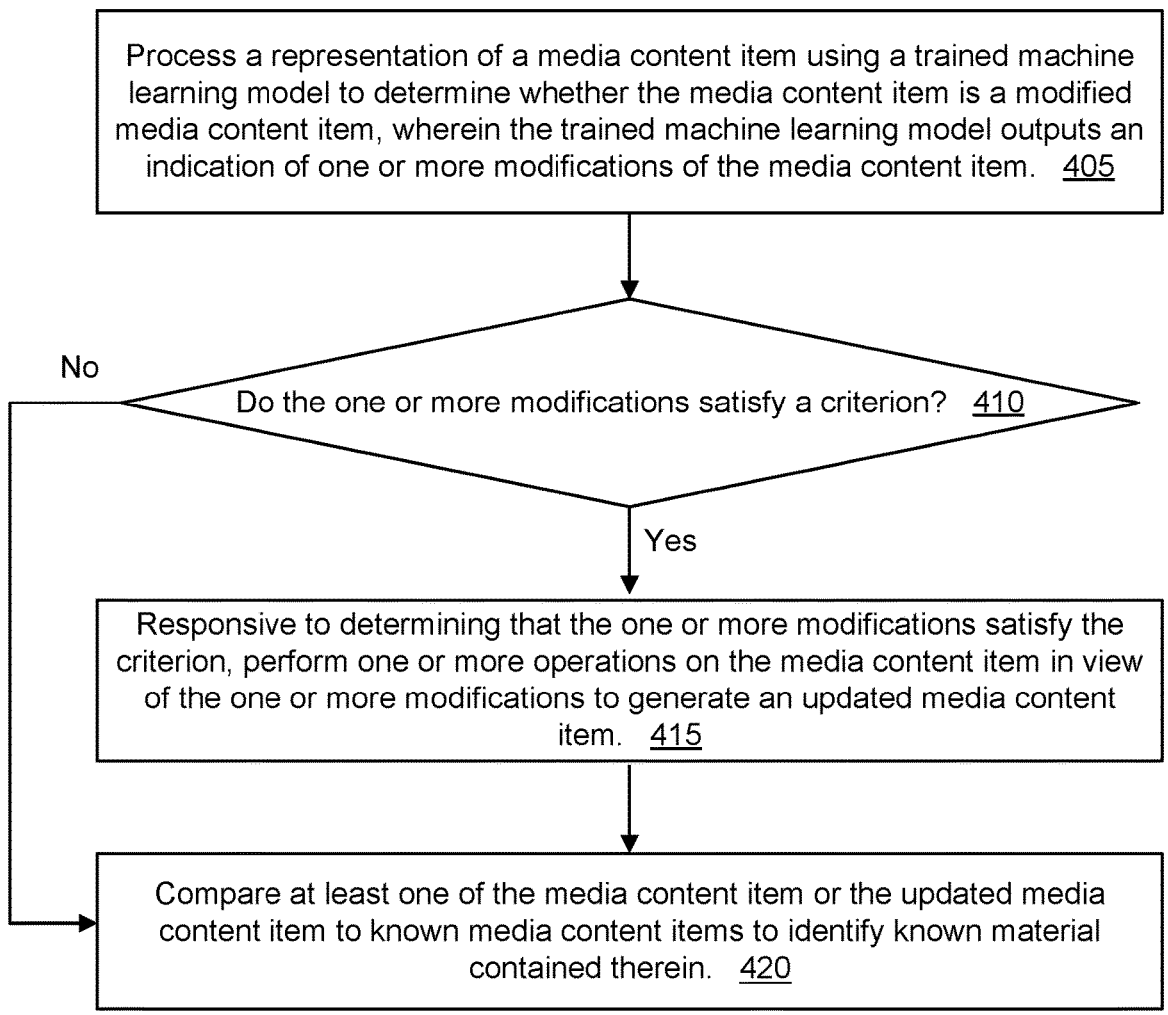
FIG. 4 is a flow diagram illustrating a method for identifying and removing modifications from a media content item, in accordance with an embodiment.

FIG. 4 is a flow diagram illustrating a method 400 for analyzing a media content item using a trained machine learning model in order to determine whether the media content item has been modified and/or to identify modification(s) of the media content item, according to embodiments of the present disclosure. Method 400 may be performed by processing logic that comprises hardware (e.g., circuitry, dedicated logic, programmable logic, microcode, etc.), software (e.g., instructions run on a processor), firmware, or a combination thereof. Method 400 may be performed, for example by one or more of computing devices 101A-B and/or server computing device 150 of FIG. 1 in embodiments.

At block 405, processing logic processes a representation of a media content item using a trained machine learning model to determine whether the media content item is a modified media content item. In some embodiments, the representation of the media content item can comprise a one-dimensional vector representing a plurality of frequency signals corresponding to a particular timeframe of the media content item. The trained machine learning model outputs an indication of one or more modifications of the media content item.

In some embodiments, processing logic can determine whether the media content item comprises music. In some embodiments, processing logic can determine not to process the media content item if it does not contain music. In some embodiments, processing logic can determine to process the media content item after determining that a threshold percentage of the media content item contains music. The analysis of determining whether a media content item contains music is described in further detail with regard to FIG. 1.

At block 410, processing logic determines whether the one or more modifications satisfy a criterion. Responsive to determining that the one or more modifications satisfy the criterion, the method proceeds to block 415. Responsive to determining that the one or more modifications does not satisfy the criterion, the method proceeds to block 420.

In some embodiments, the indication of the one or more modifications of the media content item can comprise a vector of one or more values, each value corresponding to a likelihood of one of the one or more modifications. That is, each value of the of the values in the vector represents a classification corresponding to one of the one or more modifications. In some embodiments, in order for a modification to satisfy the criterion, the likelihood corresponding to the modification is above a threshold value (e.g., above 0.5). Processing logic can determine that each modification that has a corresponding likelihood over the threshold value satisfies the criterion.

In some embodiments, the indication of the one or more modifications can comprise a value corresponding to the one or more modifications. In some embodiments, in order for a modification to satisfy the criterion, the value in the indication corresponding to the modification is outside of a threshold range. For example, for a machine learning model trained to output a value indicating a speed rate of the media content item, the modification can satisfy the criterion if the modified speed rate is greater than (or less than) the original speed rate by a threshold amount. For example, some identification services can tolerate a small speed rate modification when identifying known works within an unknown media content item. Thus, if the modified speed rate output by the trained machine learning model is within 0.1 of the original speed rate (e.g., the output speed rate modification is 0.9 or 1.1), processing logic can determine that the modification does not satisfy the criterion. The method can proceed to block 420, and the processing logic can compare the media content item to known media content items to identify known material contained therein. The known material may be a subset of a known media content item, for example. If the modified speed rate output by the trained machine learning mode is outside of 0.1 of the original speed rate (e.g., the output speed rate modification is 1.2 or greater, or 0.8 or lower), processing logic can determine that the modification satisfies the criterion. The method can proceed to block 415.

At block 415, responsive to determining that the one or more modifications satisfy the criterion, processing logic performs one or more operations on the media content item in view of the one or more modifications to generate an updated media content item. The one or more operations can be to reverse the identified one or more modifications, such as resampling the audio a different sample rate (i.e., based on at least one of the identified modifications) to slow down the audio, and playing the audio back at the original sampling rate. In some embodiments, the modification can include a change in the speed without changing the pitch, or a change in pitch without a change in the speed, for example. The processing logic can reverse the change in speed (which may not include a change in pitch) by applying a digital signal processing technique to stretch the time factor by the opposite change in speed value, e.g., using a 1.0/1.3 time stretching factor to correct a 1.3 time stretching factor. As an other example, the processing logic can reverse a change in pitch (which my not include a change in speed) by applying a digital signal processing technique that applies the opposite change in pitch factor, e.g., by shifting the itch by two semitones down to correct audio that has been shifted by two semitones up. As another example, one of the modifications identified by the processing logic can be that the video was flipped upside down. Processing logic can perform an operation suing the same sample video processing to flip it right side up.

In some embodiments, performing the one or more operations on the media content item in view of the one or more modifications can include identifying, based on the indication, a first modification of the one or more modifications that has a highest likelihood of being present in the media content item. Processing logic can perform, on the media content item, an operation to reverse the first modification to generate the updated media content item.

At block 420, processing logic compares at least one of the media content item or the updated media content item to known media content items to identify known material contained therein. That is, if at block 410, processing logic determined that the one or more modifications does not satisfy the criterion, at block 420, processing logic can compare the media content item to known media content items to identify known material contained therein. If at block 410, processing logic determined that the one or more modifications satisfy the criterion, at block 420, processing logic can compare the updated media content item to the known media content items to identify known material contained therein.

In some embodiments, to compare the updated media content item to the known media content items to identify known material contained therein, processing logic can compare a digital fingerprint of the updated media content item to a plurality of additional digital fingerprints of the known media content items. Processing logic can identify a match between the digital fingerprint and an additional digital fingerprint of the additional digital fingerprints. The identified additional digital fingerprint can be for a segment of a known media content item of the known media content items. Thus, by identifying a match, processing logic can determine that the media content item comprises an instance of the known media content item.

In some embodiments, processing logic can determine, based on the comparison, that the media content item does not contain known material. Processing logic can then identify, based on the indication, a second modification of the one or more modifications that has a second highest likelihood of being present in the media content item. Processing logic can perform, on the media content item, a second operation to reverse the second modification to generate a second updated media content item. Processing logic can compare the second updated media content item to the known works to identify known material contained therein.

In some embodiments, processing logic can perform the second operation to reverse the second modification on the updated media content item. That is, processing logic can perform a first operation to reverse the first modification that has the highest likelihood of being present in the modification, and responsive to not getting a match to a known work, can then perform the second operation to reverse the second modification that the second highest likelihood of being present in the modification. The processing logic can continue performing operations, one at a time, to reverse the one or more modifications in order of likelihood of being present, and compare the updated media content item to known works after performing each operation, until a match is identified. In some embodiments, the processing logic can perform an operation to reverse a modification if the likelihood of the modification being present in the media content item is above a threshold.

Figure 5:
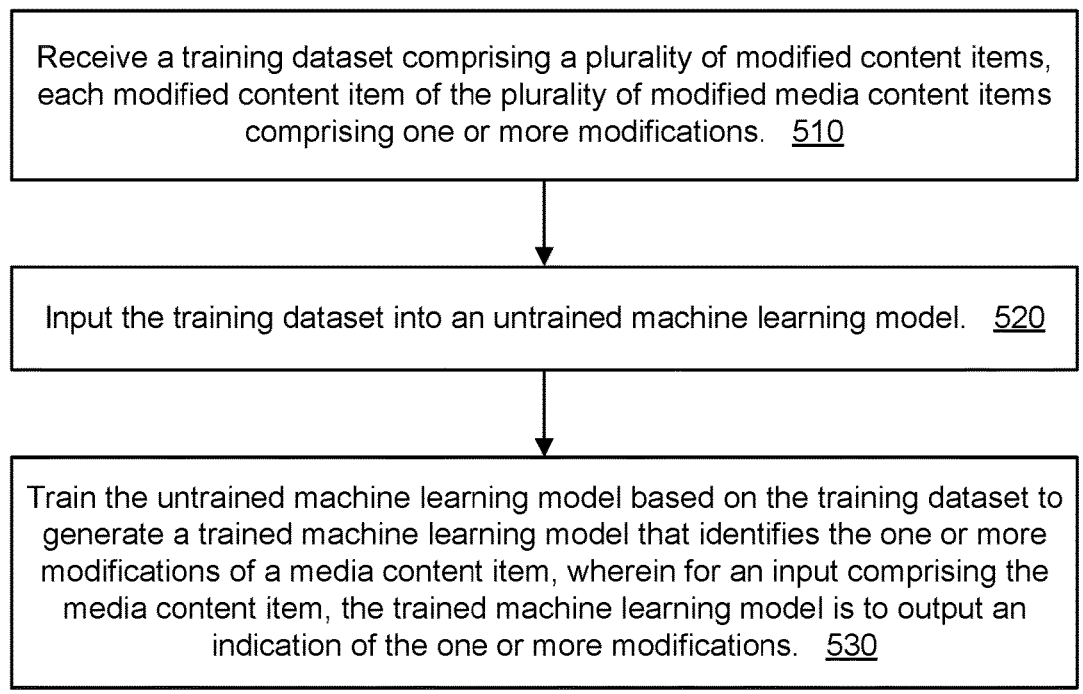
FIG. 5 is a flow diagram illustrating a method for training a machine learning model to identify modifications in a media content item, in accordance with an embodiment.

FIG. 5 is a flow diagram illustrating a method 500 for training a machine learning model to identify modifications in a media content item, according to embodiments of the present disclosure. Method 500 may be performed by processing logic that comprises hardware (e.g., circuitry, dedicated logic, programmable logic, microcode, etc.), software (e.g., instructions run on a processor), firmware, or a combination thereof. Method 500 may be performed, for example by one or more of computing devices 101A-B and/or server computing device 150 of FIG. 1 in embodiments.

At block 510, processing logic receives a training dataset that includes a plurality of modified content items. Each modified content item of the plurality of modified content items comprises one or more modifications. In some embodiments, the modification(s) can correspond to a particular type of modification, such as a change in pitch or speed. In some embodiments, the modification(s) can correspond to more than one type of modification, such as changes in both pitch and speed. In some embodiments, the training dataset can include representations of the modified media content items. A representation of a modified media content item can be a one-dimensional vector representing multiple frequency signals corresponding to a particular timeframe of the modified media content item.

At block 520, processing logic input the training dataset into an untrained machine learning model. At block 530, processing logic trains the machine learning model based on the training dataset to generated a trained machine learning model that identifies the one or more modifications of a media content item. For an input comprising the media content item, the trained machine learning model is to output an indication of the one or more modifications. In some embodiments, the input comprising the media content item can be a representation of the media content item, such as a one-dimensional vector representing multiple frequency signals corresponding to a particular timeframe of the media content item.

In some embodiments, the untrained machine learning model is trained using a classification algorithm, and thus is trained as a classification machine learning mode. In such embodiments, the indication output from the classification machine learning model can be a vector of values. Each value can correspond to one of the one or more modifications. A value in the vector can represent a classification corresponding to one of the modifications. For example, the machine learning model can be trained to classify the speed rates of the media content item. Each value in the vector can correspond to a particular speed rate, e.g., ranging from 0.4 to 2.1. The output of the trained machine learning model can be a vector of values, each value representing a likelihood (e.g., a value between 0 and 1) that the corresponding speed rate is present in the media content item. As an illustrative example, if the media content item has been sped up by a factor of 1.6, the output of the trained machine learning model can include a vector of values in which the value corresponding to the speed rate of 1.6 is closer to 1, while the values corresponding to the other speed rates (e.g., 0.4 to 1.5, and 1.7 to 2.1) are closer to 0.

In some embodiments, the untrained machine learning model is trained using a regression algorithm, and thus is trained as a regression machine learning model. In such embodiments, the indication output from the regression machine learning model can be a value corresponding to a particular modification. In some embodiments, the indication output from the regressions machine learning model can include multiple values, each one corresponding to a particular modification. For example, the machine learning model may be trained to predict the speed rate of a media content item, and the regression machine learning model may output the predicted speed rate of the media content item.

Figure 6:
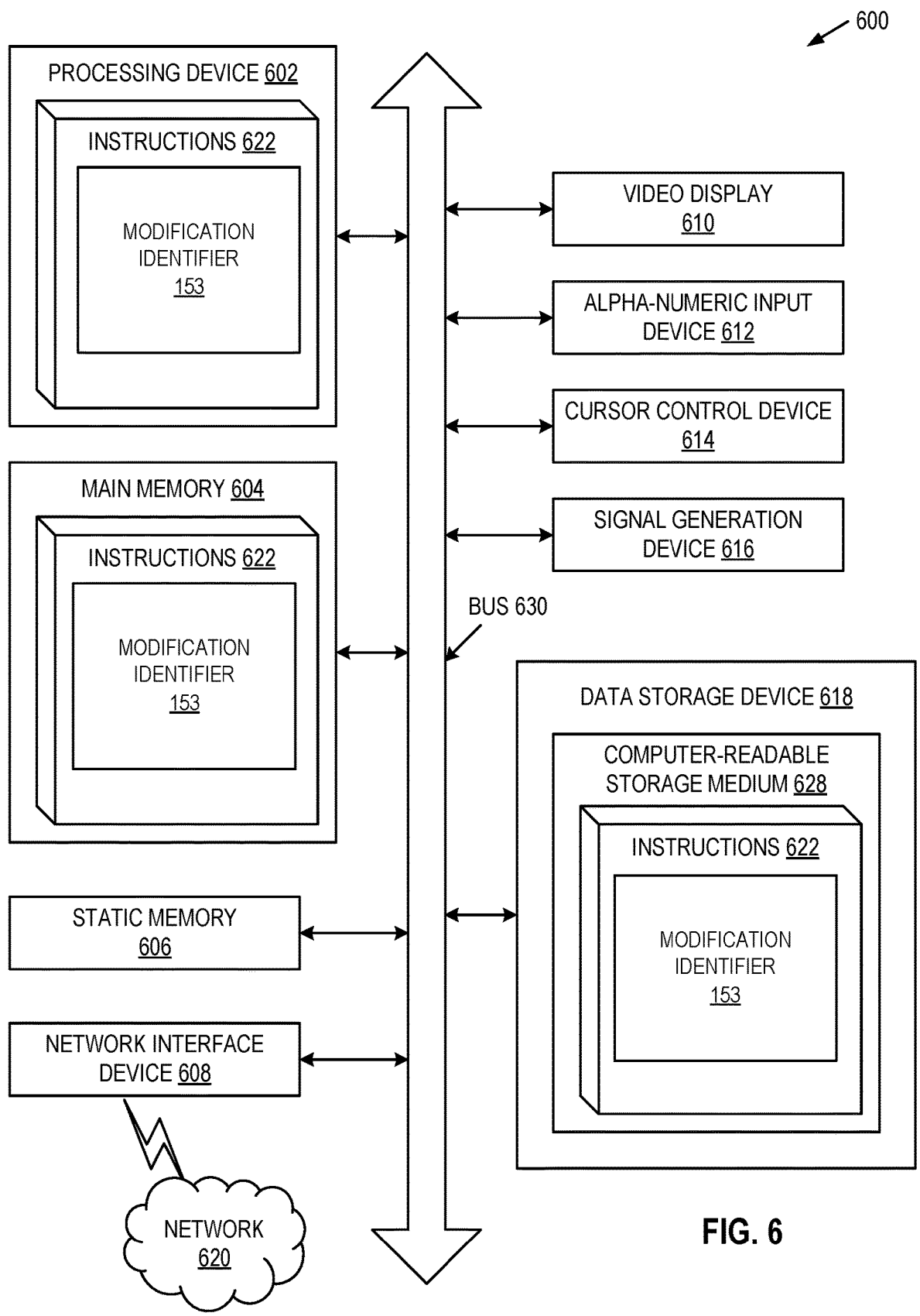
FIG. 6 is a block diagram illustrating an exemplary computer system, according to an embodiment.

FIG. 6 illustrates a diagrammatic representation of a machine in the exemplary form of a computing device 600 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server computing device, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computing device 600 may represent computing devices 101A-B, and/or server computing device 150, as shown in FIG. 1.

The computing device 600 includes a processing device (processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)), and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute the modification identifier 153 for performing the operations and steps discussed herein.

The computing device 600 may further include a network interface device 608. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a computer-readable medium 628 on which is stored one or more sets of instructions 622 (e.g., instructions of modification identifier 153) embodying any one or more of the methodologies or functions described herein. The instructions 622 may also reside, completely or at least partially, within the main memory 604 and/or within processing logic 626 of the processing device 602 during execution thereof by the computing device 600 (also referred to as a computer system), the main memory 604 and the processing device 602 also constituting computer-readable media. The instructions may further be transmitted or received over a network 620 via the network interface device 608.

While the computer-readable storage medium 628 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular implementations may vary from these exemplary details and still be contemplated to be within the scope of the present disclosure.

In the above description, numerous details are set forth. It will be apparent, however, to one of ordinary skill in the art having the benefit of this disclosure, that embodiments of the disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "determining", "identifying", "comparing", "selecting", "generating" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. In addition, embodiments of the present disclosure are not described with reference to any particular programming language. It will be appreciated that a variety of programming languages may be used to implement the teachings of the disclosure as described herein.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
processing, using a trained machine learning model provided by a computing device, a representation of a media content item to determine whether the media content item is a modified media content item, wherein the trained machine learning model outputs an indication of one or more modifications of the media content item;
determining whether the one or more modifications satisfy a criterion;
responsive to determining that the one or more modifications satisfy the criterion, performing a first operation of one or more operations on the media content item to reverse a first modification of the one or more modifications to generate an updated media content item, wherein the first modification has a highest likelihood of being present in the media content item;
comparing the updated media content item to known media content items to identify known material contained therein;
responsive to determining, based on the comparison, that the media content item does not contain known material, identifying based on the indication, a second modification of the one or more modifications that has a second highest likelihood of being present in the media content item;
performing on the media content item, a second operation to reverse the second modification to generate a second updated media content item; and
comparing the second updated media content item to the known media content items to identify known material contained therein.

2. The method of claim 1, wherein the indication of the one or more modifications of the media content item comprises a vector of one or more values, each value corresponding to a likelihood of one of the one or more modifications.

3. The method of claim 1, wherein the indication of the one or more modifications of the media content item comprises a value corresponding to the one or more modifications.

4. The method of claim 1, wherein the representation of the media content item comprises a one-dimensional vector representing a plurality of frequency signals corresponding to a particular timeframe of the media content item.

5. The method of claim 1, further comprising:
identifying, based on the indication, the first modification of the one or more modifications that has the highest likelihood of being present in the media content item.

6. The method of claim 1, further comprising:
determining whether the media content item comprises music.

7. The method of claim 1, wherein comparing the updated media content item to the known media content items to identify known material contained therein comprises:
comparing a digital fingerprint of the updated media content item to a plurality of additional digital fingerprints of the known media content items;
identifying a match between the digital fingerprint and an additional digital fingerprint of the additional digital fingerprints, wherein the additional digital fingerprint is for a segment of a known media content item of the known media content items; and
determining that the media content item comprises an instance of the known media content item.

8. A computer readable medium comprising instructions that, when executed by a processing device, cause the processing device to perform operations comprising:
processing, using a trained machine learning model provided by a computing device, a representation of a media content item to determine whether the media content item is a modified media content item, wherein the trained machine learning model outputs an indication of one or more modifications of the media content item;
determining whether the one or more modifications satisfy a criterion;
responsive to determining that the one or more modifications satisfy the criterion, performing a first operation of one or more operations on the media content item to reverse a first modification of the one or more modifications to generate an updated media content item, wherein the first modification has a highest likelihood of being present in the media content item;

comparing the updated media content item to known media content items to identify known material contained therein;
responsive to determining, based on the comparison, that the media content item does not contain known material, identifying, by the processing device, based on the indication, a second modification of the one or more modifications that has a second highest likelihood of being present in the media content item;
performing, by the processing device, on the media content item, a second operation to reverse the second modification to generate a second updated media content item; and
comparing, by the processing device, the second updated media content item to the known media content items to identify known material contained therein.

9. The computer readable medium of claim 8, wherein the indication of the one or more modifications of the media content item comprises a vector of one or more values, each value corresponding to a likelihood of one of the one or more modifications.

10. The computer readable medium of claim 8, wherein the indication of the one or more modifications of the media content item comprises a value corresponding to the one or more modifications.

11. The computer readable medium of claim 8, wherein the representation of the media content item comprises a one-dimensional vector representing a plurality of frequency signals corresponding to a particular timeframe of the media content item.

12. The computer readable medium of claim 8, the operations further comprising:
identifying, based on the indication, the first modification of the one or more modifications that has the highest likelihood of being present in the media content item.

13. The computer readable medium of claim 8, the operations further comprising:
determining whether the media content item comprises music.

14. The computer readable medium of claim 8, wherein comparing the updated media content item to the known media content items to identify known material contained therein comprises:
comparing a digital fingerprint of the updated media content item to a plurality of additional digital fingerprints of the known media content items;
identifying a match between the digital fingerprint and an additional digital fingerprint of the additional digital fingerprints, wherein the additional digital fingerprint is for a segment of a known media content item of the known media content items; and
determining that the media content item comprises an instance of the known media content item.

15. A system comprising:
a memory; and
a processing device operatively coupled to the memory, the processing device to:
process a representation of a media content item using a trained machine learning model to determine whether the media content item is a modified media content item, wherein the trained machine learning model outputs an indication of one or more modifications of the media content item;
determine whether the one or more modifications satisfy a criterion;
responsive to determining that the one or more modifications satisfy the criterion, perform a first operation of one or more operations on the media content item to reverse a first modification of the one or more modifications to generate an updated media content item, wherein the first modification has a highest likelihood of being present in the media content item;
compare the updated media content item to known media content items to identify known material contained therein;
responsive to determining, based on the comparison, that the media content item does not contain known material, identify, by the processing device, based on the indication, a second modification of the one or more modifications that has a second highest likelihood of being present in the media content item;
perform, by the processing device, on the media content item, a second operation to reverse the second modification to generate a second updated media content item; and
compare, by the processing device, the second updated media content item to the known media content items to identify known material contained therein.

16. The system of claim 15, wherein the indication of the one or more modifications of the media content item comprises a vector of one or more values, each value corresponding to a likelihood of one of the one or more modifications.

17. The system of claim 15, wherein the indication of the one or more modifications of the media content item comprises a value corresponding to the one or more modifications.

18. The system of claim 15, wherein the representation of the media content item comprises a one-dimensional vector representing a plurality of frequency signals corresponding to a particular timeframe of the media content item.

19. The system of claim 15, wherein to compare the updated media content item to the known media content items to identify known material contained therein, the processing device is further to:
compare a digital fingerprint of the updated media content item to a plurality of additional digital fingerprints of the known media content items;
identify a match between the digital fingerprint and an additional digital fingerprint of the additional digital fingerprints, wherein the additional digital fingerprint is for a segment of a known media content item of the known media content items; and determine that the media content item comprises an instance of the known media content item.

20. A method comprising:
processing a representation of a media content item using a trained machine learning model to determine whether the media content item is a modified media content item, wherein the trained machine learning model outputs an indication of one or more modifications of the media content item;
determining whether the one or more modifications satisfy a criterion;
responsive to determining that the one or more modifications satisfy the criterion, performing one or more operations on the media content item in view of the one or more modifications to generate an updated media content item; and
comparing the updated media content item to known media content items to identify known material contained therein by:

comparing a digital fingerprint of the updated media content item to a plurality of additional digital fingerprints of the known media content items;
identifying a match between the digital fingerprint and an additional digital fingerprint of the additional digital fingerprints, wherein the additional digital fingerprint is for a segment of a known media content item of the known media content items; and
determining that the media content item comprises an instance of the known media content item.

\* \* \* \* \*